United States Patent [19]

Tacklind

[11] Patent Number: 4,503,444
[45] Date of Patent: Mar. 5, 1985

[54] METHOD AND APPARATUS FOR GENERATING A GRAY SCALE WITH A HIGH SPEED THERMAL INK JET PRINTER

[75] Inventor: Christopher A. Tacklind, Palo Alto, Calif.

[73] Assignee: Hewlett-Packard Company, Palo Alto, Calif.

[21] Appl. No.: 490,003

[22] Filed: Apr. 29, 1983

[51] Int. Cl.³ .............................................. G01D 15/18
[52] U.S. Cl. .................................. 346/140 R; 346/1.1
[58] Field of Search .............. 346/140 R, 140 PD, 1.1

[56] References Cited

U.S. PATENT DOCUMENTS 4,339,762  7/1982  Shirato et al. ................... 346/140 R
4,353,079  10/1982  Kawanabe ....................... 346/140 R

*Primary Examiner*—Thomas H. Tarcza
*Assistant Examiner*—Patrick W. Foster
*Attorney, Agent, or Firm*—Douglas A. Kundrat

[57] ABSTRACT

A thermal ink jet printer emits discrete drops of a variable volume in order to create a printed gray scale. A pulse train of packets of pulses is used to generate drops comprising packets of connected or merged droplets; the reciprocal of the pulse repetition rate is greater than the bubble collapse time and the pulse packet rate is less than the maximum single droplet emission rate of the print head. The individual droplets within the packet merge in flight to create a single drop whose volume depends upon the number of pulses contained within the pulse packet. The summing of impulses generated by the individual pulses is also useful so that drops of ink may be emitted by a resistor which is physically undersized for the particular ink being used.

16 Claims, 5 Drawing Figures

METHOD AND APPARATUS FOR GENERATING A GRAY SCALE WITH A HIGH SPEED THERMAL INK JET PRINTER

BACKGROUND AND SUMMARY OF THE INVENTION

Thermal ink jet printers are operative for emitting ink droplets as described in U.S. patent application No. 292,841 which was filed by Vaught et al on Aug. 14, 1981, and which is incorporated by reference herein. Such thermal ink jet printers emit single ink droplets onto a page to form printed characters. The utility of prior art thermal ink jet printers has been inhibited because of the difficulty involved in creating a printed gray scale.

One prior art gray scale approach has been to aim multiple ink jets at one page location to allow variations in the darkness of a printed dot. This prior art approach requires a complex electromechanical system to coordinate the multiple jets. Another prior art approach, described in U.S. Pat. No. 4,353,079, is to have a single ink jet emit a series of discrete droplets to form a single dot on the page. This prior art approach has the inherent problem that the speed at which dots may be printed on the page is seriously limited.

In accordance with the illustrated preferred embodiment of the present invention, a thermal ink jet printer is capable of providing a printed gray scale at a high printing speed. A packet of current pulses is applied to the resistor of a single ink jet to cause emission of a packet of droplets. The interval between individual pulses is long enough that bubble collapse may occur after application of each pulse, yet short enough that the droplets do not individually break off from the ink jet orifice. Thus, the individual droplets within the packet remain connected and merge in flight to form a single drop. The drop breaks off from the orifice only after emission of the last droplet in the packet. Since the probability of ink jet malfunction is related to the rate at which break-offs occur, by having only a single break-off for each packet, i.e., drop, the drop emission rate can approach the single droplet emission rate without an increase in the probability of malfunction. In the illustrated preferred embodiment of the present invention, a multi-tone gray scale is possible at drop emission rates which approach the maximum single droplet emission rate of the thermal ink jet printer.

In the situation where a thermal ink jet printer is operated with a resistor which is undersized for a given ink, it is often the case that a single current pulse is insufficient to cause emission of an ink droplet. The illustrated preferred embodiment of the present invention is useful, in this situation, for providing a pulse packet in which the impulses generated by the individual pulses are combined to cause emission of a single ink drop.

DETAILED DESCRIPTION OF THE PREFERRED EMBODIMENT

Figure 1:
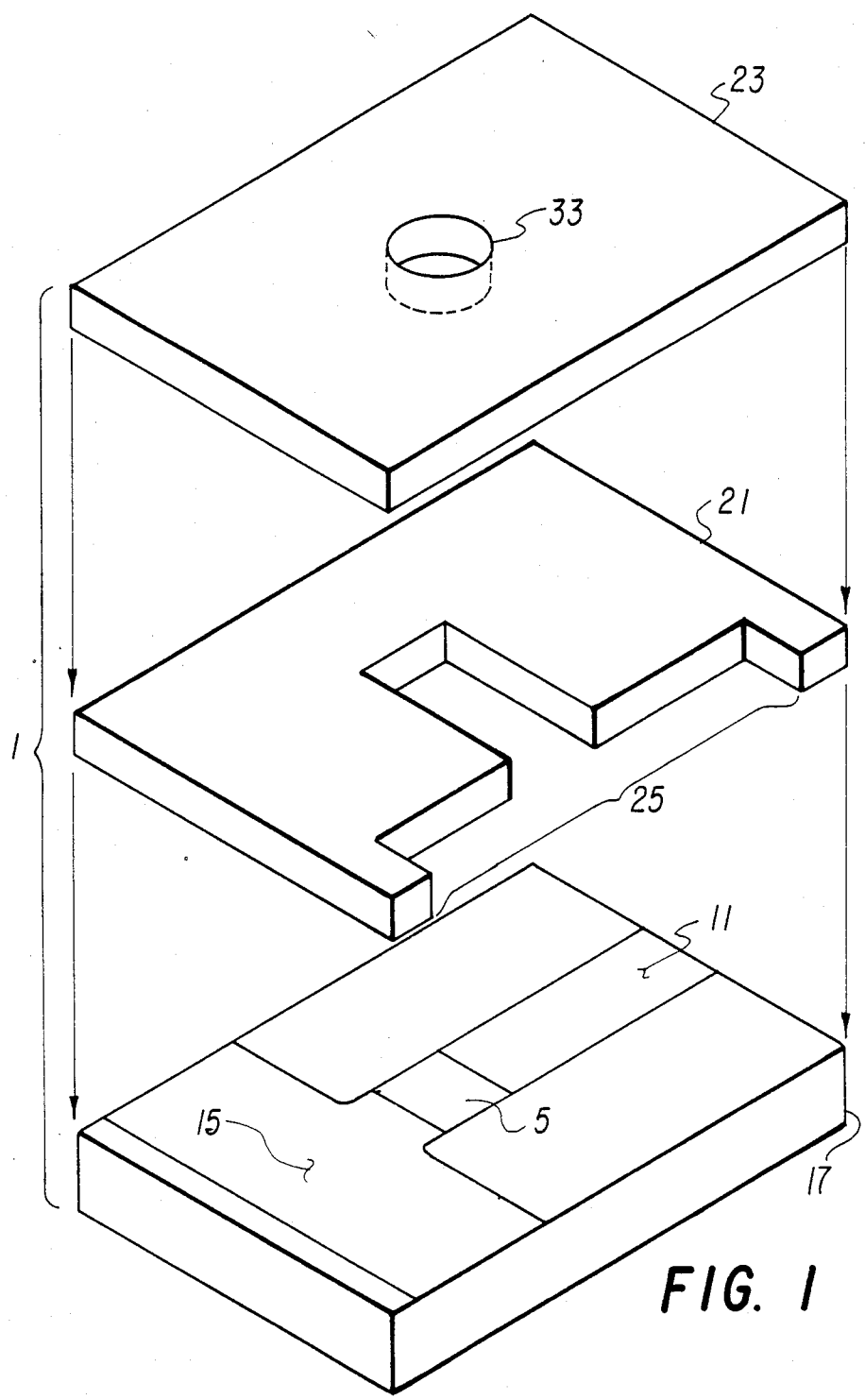
FIG. 1 shows a thermal ink jet print head which is constructed in accordance with the preferred embodiment of the present invention.

FIG. 1 shows a thermal ink jet print head 1 which is constructed in accordance with the preferred embodiment of the present invention and which is described in the above-referenced Vaught et al U.S. patent application. When a current pulse is applied through resistor 5 via conductor 11 and ground line 15, resistor 5 is resistively heated and a vapor bubble is created overlaying resistor 5 in the ink within channel 25. An impulse generated by the growth of the bubble causes the ink within orifice 33 to move outwards and, consequenly, a droplet of ink may be emitted from orifice 33.

Figure 2:
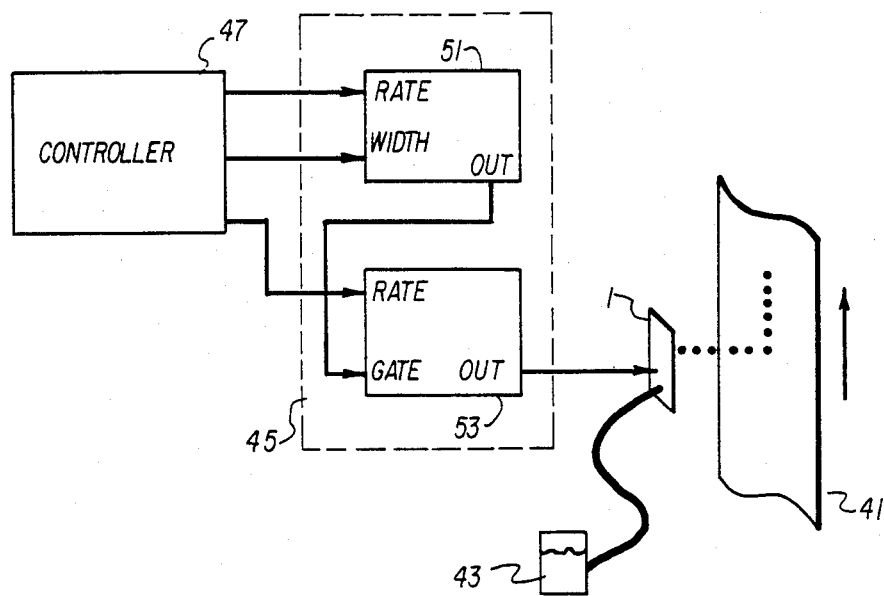
FIG. 2 shows a thermal ink jet printer which is constructed in accordance with the preferred embodiment of the present invention and which uses the print head shown in FIG. 1.

FIG. 2 shows a thermal ink jet printer which is constructed in accordance with the preferred embodiment of the present invention utilizing the print head shown in FIG. 1. Ink from reservoir 43 fills channel 25 by capillary action to overlay resistor 5. Controller 47, which may comprise a microprocessor, instructs pulser 45 to apply a current pulse to resistor 5 in order to cause an ink droplet to be emitted from orifice 33 onto page 41. In typical prior art printers the maximum single droplet emission rate (the maximum rate at which single droplets are successfully emitted by single pulses) is roughly 10 kHz and bubble collapse occurs at a time less than 20 microseconds after application of a pulse. As the single droplet emission rate exceeds 10 kHz the probability of malfunction, which is typically caused by orifice wetting, increases dramatically.

The pulse repetition rate of pulser 45 must allow sufficient time between pulses for the individual bubbles created by resistor 5 to collapse. For print head 1 the bubble collapse time is less than 20 microseconds and, therefore, the maximum pulse repetition rate is approximately 50 kHz. Further, in order to allow the individual droplets within a packet to merge into a single drop, the spacing between the pulses within a packet must be less than the droplet break-off interval so that the individual droplets do not break off from the orifice 33. This limit varies with the physical parameters of the print head and with the characteristics of the ink being used and will typically be less than the reciprocal of the maximum single droplet emission rate for a given set of conditions. A pulseless blanking interval between pulse packets must be greater than the droplet break-off interval to allow the drop created by a pulse packet to break off from orifice 33.

Pulser 45 may comprise first and second pulse generators 51 and 53 as shown in FIG. 2. Controller 47 sets the gate width of pulse generator 51, such as a Hewlett-Packard Co. model 8013B, and the number of pulses in a particular packet to be applied to print head 1 is thereby specified. The repetition rate of pulse generator 51 is set manually or by controller 47 to specify the packet rate of the pulses applied to print head 1. The output of pulse generator 51 is connected to a gate input of pulse generator 53 which may comprise, for example, a Hewlett-Packard Co. model 214B. The repetition rate of pulse generator is set manually or by controller 47 to specify the pulse repetition rate. The output of pulse generator 53 is connected to resistor 5 of print head 1.

The printer shown in FIG. 2 utilizes a 3 mil diameter nickel orifice 33, a 2 mil thick channel 25, and a 3 mil square 5 ohm unpassivated metallic glass resistor 5. An ink having a carrier comprising equal parts of water and diethylene glycol was used. Under these conditions, print head 1 has a maximum single droplet emission rate of roughly 10 kHz and individual droplet break-off occurs 45 microseconds after application of a pulse. The maximum single droplet emission rate, and hence the maximum pulse repetition rate, was found to be 50 kHz. Pulse packets selectably containing from zero to N pulses were used to cause emission of drops containing from zero to N droplets. Therefore, the maximum pulse packet rate, and the maximum drop printing rate, was 1/[(N/pulse repetition rate)+(blanking period)]. If under these conditions N=16, the maximum drop printing rate would be 2.74 kHz.

Figure 3:
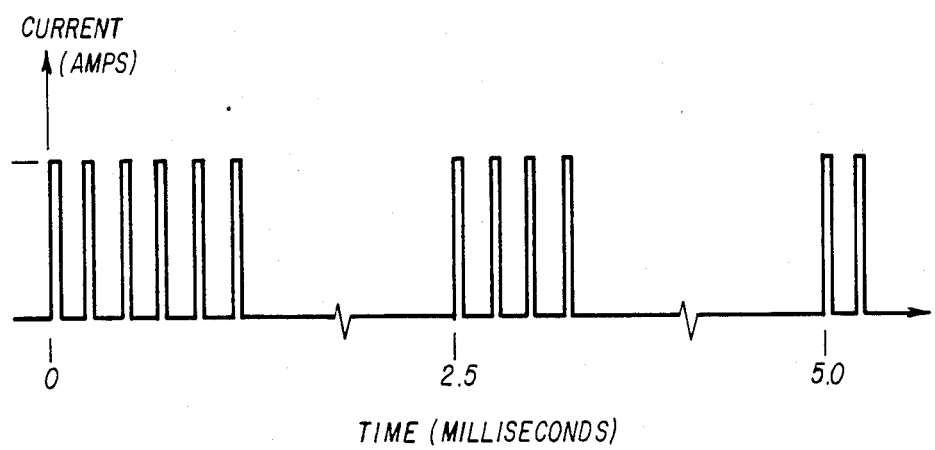
FIG. 3 shows a pulse train of three pulse packets which is generated by the pulser shown in FIG. 2.

The printer shown in FIG. 2 was also operated with a slower pulse train, a three packet portion of which is shown in FIG. 3, to generate a 16-tone gray scale. The pulse train comprised a series of pulse packets containing from zero to sixteen 1 ampere by 1 microsecond current pulses at a pulse repetition rate of 25 kHz. The individual pulses within each packet were located contiguously and the number of individual pulses contained in each packet was varied from zero to sixteen as commanded by controller 47 to create a desired darkness tone of each particular printed dot. Thus, the maximum packet width was 640 microseconds. The pulse packet rate was 400 Hz with the result that the drop printing rate (the rate at which drops are emitted towards page 41 to print dots) was also 400 Hz. A pulseless blanking interval ranging from 1.22-1.86 milliseconds existed between pulse packets. FIG. 3 shows a series of three pulse packets containing 6, 4, and 2 pulses, respectively. The result of application of these pulse packets to print head 1 was to cause emission of three separate drops from orifice 33 with the three drops having a nominal volume ratio of 6:4:2.

Figures 4A, 4B, 4C, 4D, 4E, 4F:
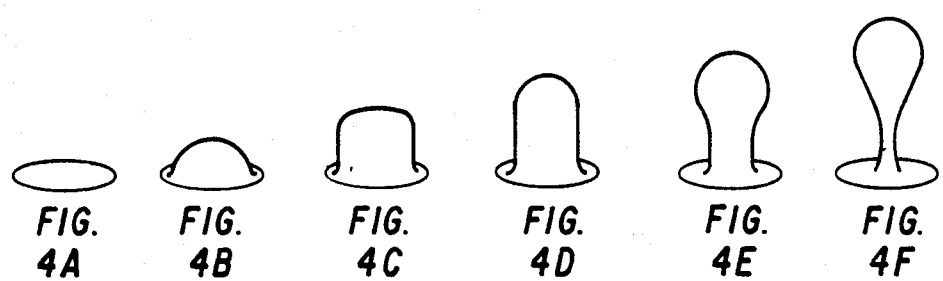
FIGS. 4A-F show various stages of initial droplet growth when a single current pulse is used in the thermal ink jet printer shown in FIG. 2.
Figures 5A, 5B, 5C, 5D, 5E, 5F:
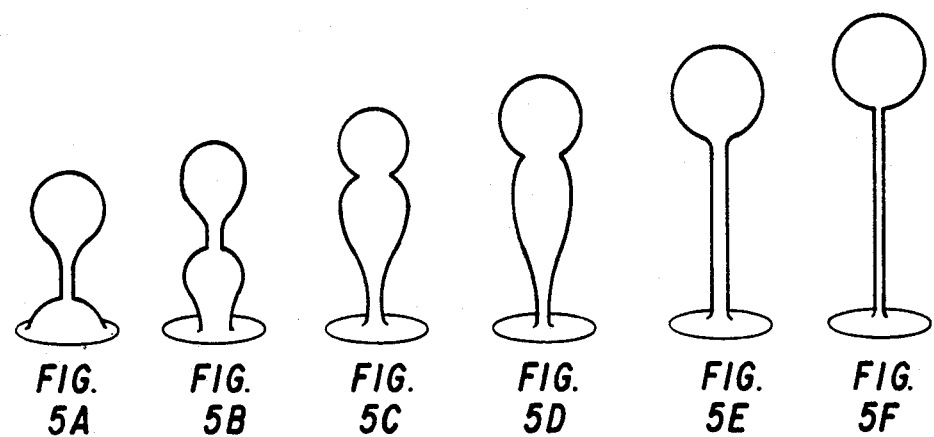
FIGS. 5A-L show droplet growth stages subsequent to those shown in FIGS. 4A-F when a pulse packet containing two current pulses is used in the thermal ink jet printer shown in FIG. 2.
Figures 5G, 5H, 5I, 5J, 5K, 5L:
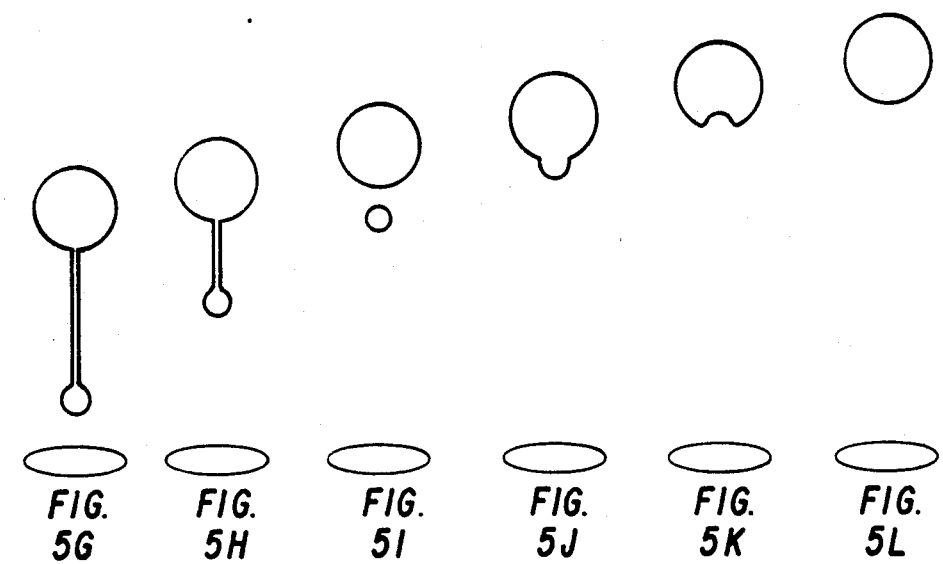

FIGS. 4A-F show various stages of droplet formation at orifice 33 within the first 40 microseconds after application of a single current pulse to resistor 5. FIGS. 4A-D show that the bubble generated by resistor 5 causes the ink meniscus within orifice 33 to expand outwards. In FIGS. 4E-F, bubble collapse has occurred, an individual droplet has started to form, and a thin tail of ink remains attached to the ink meniscus. If no additional impulses were applied to the ink meniscus the individual droplet shown in FIG. 4F would continue to move away from orifice 33 and the tail would break with the result that the droplet would break off and move towards page 41 as a discrete drop.

FIGS. 5A-L show various stages of droplet formation when a second pulse is applied to resistor 5 at a time 40 microseconds after application of the initial pulse which created the droplet shown in FIGS. 4A-F. It should be understood that FIGS. 4A-F and FIGS. 5A-L depict one continuous formation process caused by application of a packet of pulses and that this process may be extended with the use of a packet containing a larger number of pulses. FIGS. 5A-F show the effects of the application of a second pulse to resistor 5 before the break-off of the droplet shown in FIG. 4F. A second droplet is formed which merges with the first droplet to form a drop having approximately twice the volume of each of the two individual droplets. FIGS. 5G-L show the effects of break-off of the resultant drop from orifice 33.

As the number of pulses is increased, the number of individual droplets increases and the resultant drop may become elongated because the final droplets are unable to fully merge with the first droplets. If the scan speed of print head 1 relative to page 41 is increased, the elongated drops can be made to print elongated dots on page 41.

The printer shown in FIG. 2 is also useful for causing successful droplet emission when a physically undersized resistor 5 for a particular ink is used. Droplet emission occurs when a bubble generated by resistor 5 imparts enough of an impulse to the ink that a droplet moves out of orifice 33 with a velocity sufficient to overcome the surface tension of the ink and to cause the droplet to break off from the meniscus. If an insufficient impulse is imparted by the bubble the droplet will progress through the stages shown in FIGS. 4A-D and will then recede back into orifice 33. An insufficient impulse can be caused by the use of too small a resistor 5 for a particular ink since the size of the bubble is directly related to the physical size of resistor 5.

The printer shown in FIG. 2 was used with a 4 mil square metallic glass resistor 5 and a 1.8 mil by 1.8 mil silicon orifice 33. An ink carrier composed of HCONH2 (manufactured as Formamide by, e.g., the Aldrich Chemical Co.) was used and it was found that a 3 microsecond by 1.2 ampere pulse generated an optimal bubble but emission of a droplet did not occur and the ink which was protruded began to recede into orifice 33 at a recede time which occurred 60 microseconds after application of the pulse. It was found that a 6 microsecond by 1.2 ampere pulse was also unable to cause ejection of an ink droplet. In contrast, when a first 3 microsecond by 1.2 ampere pulse, which was applied at time t=0, was followed by a second 3 microsecond by 1.2 ampere pulse at time t=27 microseconds (before the first ink droplet began to recede back into the orifice 33) a drop having a diameter of 2.4 mils was successfully emitted towards page 41.

I claim:

1. A driver for applying a train of current pulse packets to a thermal ink jet printer, comprising:
   a controller for issuing a control signal;
   first generation means, coupled to the controller, for generating control pulses at a predetermined rate, for receiving the control signal, and for generating control pulses having widths determined from the control signal; and,
   second generation means, coupled to the first generation means at an input and to the thermal ink jet printer at an output, for receiving the control pulses and for presenting packets of current pulses at the output, said packets of current pulses having a preselected pulse repetition rate greater than the reciprocal of a droplet break-off interval of the thermal ink jet printer, a pulse packet rate determined from the control pulse rate, and a number of pulses per packet determined from the width of the control pulse.

2. A driver as in claim 1, wherein the current pulse packet rate is less than or equal to a maximum single droplet emission rate of the thermal ink jet printer.

3. A driver as in claim 2, wherein the current pulse repetition rate is greater than the reciprocal of a droplet break-off interval of the thermal ink jet printer.

4. A driver as in claim 3, wherein the current pulses are located contiguously within the current pulse packet.

5. A driver as in claim 4, wherein a pulseless blanking interval between current pulse packets is greater than the droplet break-off interval.

6. A driver as in claim 5, wherein the number of current pulses per packet multiplied by the current pulse packet rate is less than or equal to the reciprocal of a bubble collapse time of the thermal ink jet printer.

7. A driver as in claim 6, wherein the controller comprises a microprocessor.

8. A driver as in claim 7, wherein the number of current pulses per packet is less than or equal to 16.

9. A driver as in claim 1, wherein the current pulse rate is less than the recprocal of a bubble collapse time of the thermal ink jet printer and greater than a droplet recede time of the thermal ink jet printer.

10. A method for generating an N-tone printed gray scale with a thermal ink jet printer, comprising the steps of:
   determining a desired number of pulses required to create a dot having a desired darkness tone;
   delaying for a blanking interval after application of a previous packet to the thermal ink jet printer;
   generating a packet containing the desired number of pulses and having a pulse repetition rate greater than the reciprocal of a droplet break-off interval for the thermal ink jet printer; and,
   applying the packet to the thermal ink jet printer.

11. A method as in claim 10, wherein the blanking interval is greater than a droplet break-off interval of the thermal ink jet printer.

12. A method as in claim 11, wherein:
   the steps are repeated a plurality of times to generate a plurality of packets and a plurality of drops;
   the packets are repeated at a pulse packet rate; and,
   the pulse packet rate multiplied by N is less than or equal to the reciprocal of a bubble collapse time of the thermal ink jet printer.

13. A method as in claim 12, wherein the pulse packet rate is less than or equal to a maximum single droplet emission rate of the thermal ink jet printer.

14. A method as in claim 13, wherein the pulses are located contiguously within the packet.

15. A method for generating an ink drop with a thermal ink jet printer, comprising the steps of:
   determining a required number of pulses necessary to cause emission of the drop;
   generating a pulse packet containing the required number of pulses at a pulse repetition rate which is less than the reciprocal of a bubble collapse time of the thermal ink jet printer and greater than the reciprocal of an ink recede time of the thermal ink jet printer; and,
   applying the pulse packet to the thermal ink jet printer.

16. A method as in claim 15, wherein the steps are repeated a plurality of times to cause emission of a plurality of drops and a blanking interval greater than or equal to a droplet break-off interval of the thermal ink jet printer.

* * * * *